United States Patent [19]

Tanaka et al.

[11] Patent Number: 4,799,514
[45] Date of Patent: Jan. 24, 1989

[54] ROTARY SERVOVALVE FOR POWER-ASSISTED STEERING SYSTEM

[75] Inventors: Tsuneo Tanaka; Katsuhisa Mori, both of Okazaki, Japan

[73] Assignee: Toyoda Koki Kabushiki Kaisha, Kariya, Japan

[21] Appl. No.: 173,613

[22] Filed: Mar. 25, 1988

[30] Foreign Application Priority Data

Mar. 26, 1987 [JP] Japan .................................. 62-72850

[51] Int. Cl.⁴ .................. F15B 9/10; F16K 11/00
[52] U.S. Cl. .................... 137/625.23; 137/625.24; 91/375 R
[58] Field of Search .................. 137/625.21, 625.22, 137/625.23, 625.24; 91/375 R, 375 A

[56] References Cited

U.S. PATENT DOCUMENTS

| | | | |
|---|---|---|---|
| 4,461,321 | 7/1984 | Bacardit | 91/375 R |
| 4,577,660 | 3/1986 | Haga et al. | |
| 4,711,315 | 12/1987 | Kitamura | 91/375 R |

FOREIGN PATENT DOCUMENTS 60-56668 4/1985 Japan .

Primary Examiner—Alan Cohan
Attorney, Agent, or Firm—Oblon, Fisher, Spivak, McClelland & Maier

[57] ABSTRACT

A rotary servovalve includes a valve sleeve formed with a supply port for connection to a source of fluid under pressure and distribution ports respectively for connection to opposite fluid chambers of a hydraulic power cylinder, the valve sleeve being formed at the inner periphery thereof with circumferentially spaced sleeve channels respectively in open communication with the supply and distribution ports, and a valve rotor coupled with the valve sleeve for relative rotation thereto, the valve rotor being formed thereon with circumferentially spaced control lands which are arranged to correspond with the sleeve channels when the servovalve is in a neutral position. The control lands corresponding with the sleeve channels in open communication with the distribution ports are each formed larger in width than the corresponding sleeve channel and smaller in height than the control land corresponding with the sleeve channel in open communication with the supply port to define a predetermined clearance for restricting the flow of fluid discharged from and supplied into the distribution ports when the servovalve is in the neutral position.

2 Claims, 5 Drawing Sheets

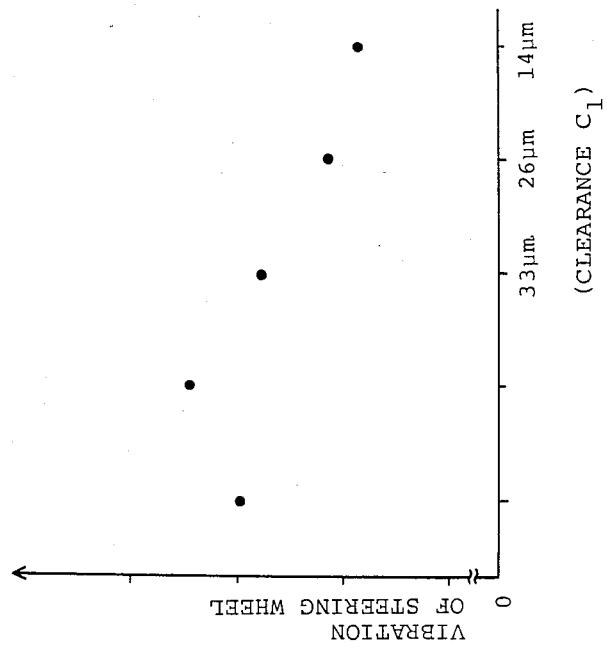
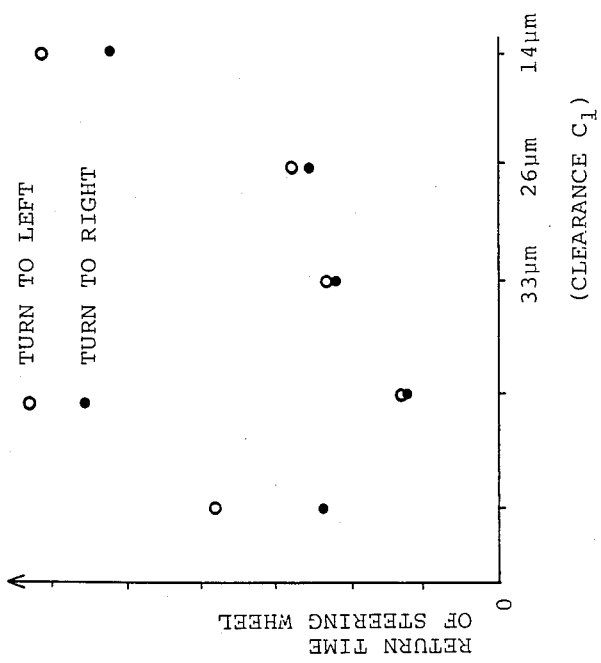

ROTARY SERVOVALVE FOR POWER-ASSISTED STEERING SYSTEM

BACKGROUND OF THE INVENTION

1. Field of the Invention

The present invention relates to a rotary servovalve adapted for use in a power-assisted steering system, and more particularly to a rotary servovalve of the constant flow type which is arranged to constantly permit the flow of fluid under pressure passing therethrough from its inlet port to its discharge port when a steering wheel is held in a neutral position.

2. Description of the Prior Art

In practical use of such a rotary servovalve as described above in a power-assisted steering system, hydraulic pressure supplied from a fluid pump is maintained at a low level defined by passage resistance when the steering wheel is held in a neutral position and increases in accordance with an increase of load acting on the fluid pump when the steering wheel is turned. This is useful to reduce power consumption caused by operation of the fluid pump and to provide hydraulic assist power for smooth operation of the steering wheel. In the rotary servovalve, however, distribution ports in connection to opposite fluid chambers of a hydraulic power cylinder are communicated with inlet and discharge ports when the steering wheel is held in the neutral position. This means that the rotary servovalve does not serve to retain a piston of the power cylinder in a neutral position. As a result, the piston of the power cylinder is displaced by a disturbance reaction force applied thereto from a road surface. When applied with such a disturbance reaction force during high speed straight travel of the vehicle, the power cylinder acts to render operation of the steering wheel unstable, and the operator is involved in an insecure condition due to unexpected vibration of the steering wheel.

To overcome the foregoing brawback, an improved rotary servovalve has been proposed in Japanese Patent Early Publication No. 60-56668, which includes, as shown in FIG. 7, a valve rotor 4 having a plurality of circumferentially spaced control lands 7 arranged to close distribution ports 6 connected to opposite fluid chambers of a hydraulic power cylinder P when the servovalve is in a neutral position. In such a rotary servovalve, however, the valve rotor 4 acts to interrupt the flow of fluid discharged from one of the opposite fluid chambers of the power cylinder and supplied into the other fluid chamber when the steering wheel is returned to the neutral position from a steered position. As a result, smooth return operation of the steering wheel to the neutral position may not be effected when the power cylinder is applied with a return force from the road wheels.

SUMMARY OF THE INVENTION

It is, therefore, a primary object of the present invention to provide an improved rotary servovalve capable of retaining the piston of the power cylinder in the neutral position against a disturbance reaction force acting thereon during high speed straight travel of the vehicle and of effecting smooth return operation of the steering wheel to the neutral position from a steered position.

According to the present invention, the primary object is attained by providing a rotary servovalve adapted for use in combination with a hydraulic power cylinder. The servovalve includes a valve sleeve formed in a peripheral wall thereof with a supply port for connection to a source of fluid under pressure and distribution ports respectively for connection to opposite fluid chambers of the power cylinder, the valve sleeve being formed at the inner periphery thereof with circumferentially spaced sleeve channels respectively in open communication with the supply and distribution ports, and a valve rotor coupled within the valve sleeve for relative rotation thereto, the valve rotor being formed thereon with circumferentially spaced control lands which are arranged to correspond with the sleeve channels when the servovalve is in a neutral position. The control lands corresponding with the sleeve channels in open communication with the distribution ports are each formed larger in width than the corresponding sleeve channel and smaller in height than the control land corresponding with the sleeve channel in open communication with the supply port to provide a predetermined clearance for restricting the flow of fluid discharged from one of the distribution ports and supplied into the other distribution port when the servovalve is in the neutral position.

BRIEF DESCRIPTION OF THE DRAWINGS

Other objects, features and advantages of the present invention will become more apparent from the following detailed description of a preferred embodiment and modification thereof when considered with reference to the accompanying drawings, in which:

FIG. 4 is a graph showing vibration of a steering wheel plotted in relation to clearances illustrated in FIG. 3;

FIG. 5 is a graph showing a return time of the steering wheel plotted in relation to the clearances illustrated in FIG. 3;

DESCRIPTION OF THE PREFERRED EMBODIMENTS

Figure 1:
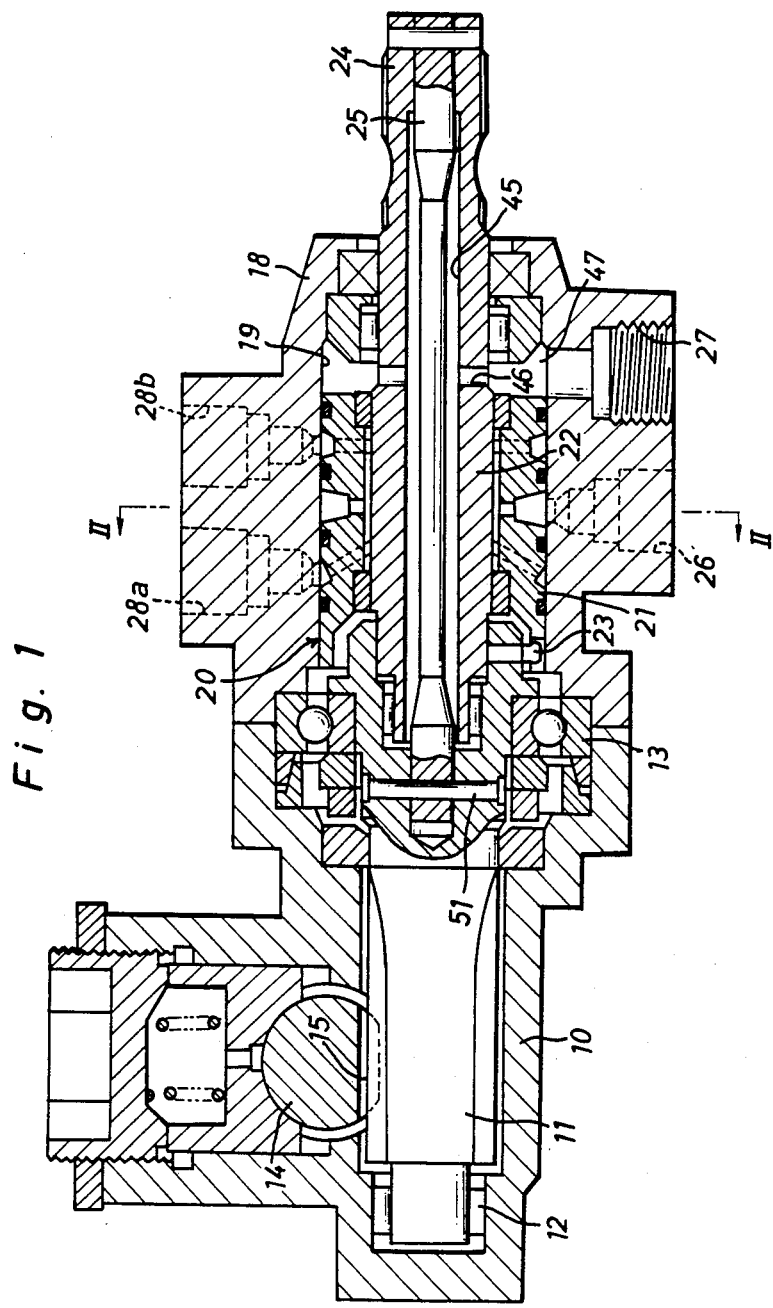
FIG. 1 is a sectional view of a rotary servovalve adapted to a power-assisted steering system.
Figure 2:
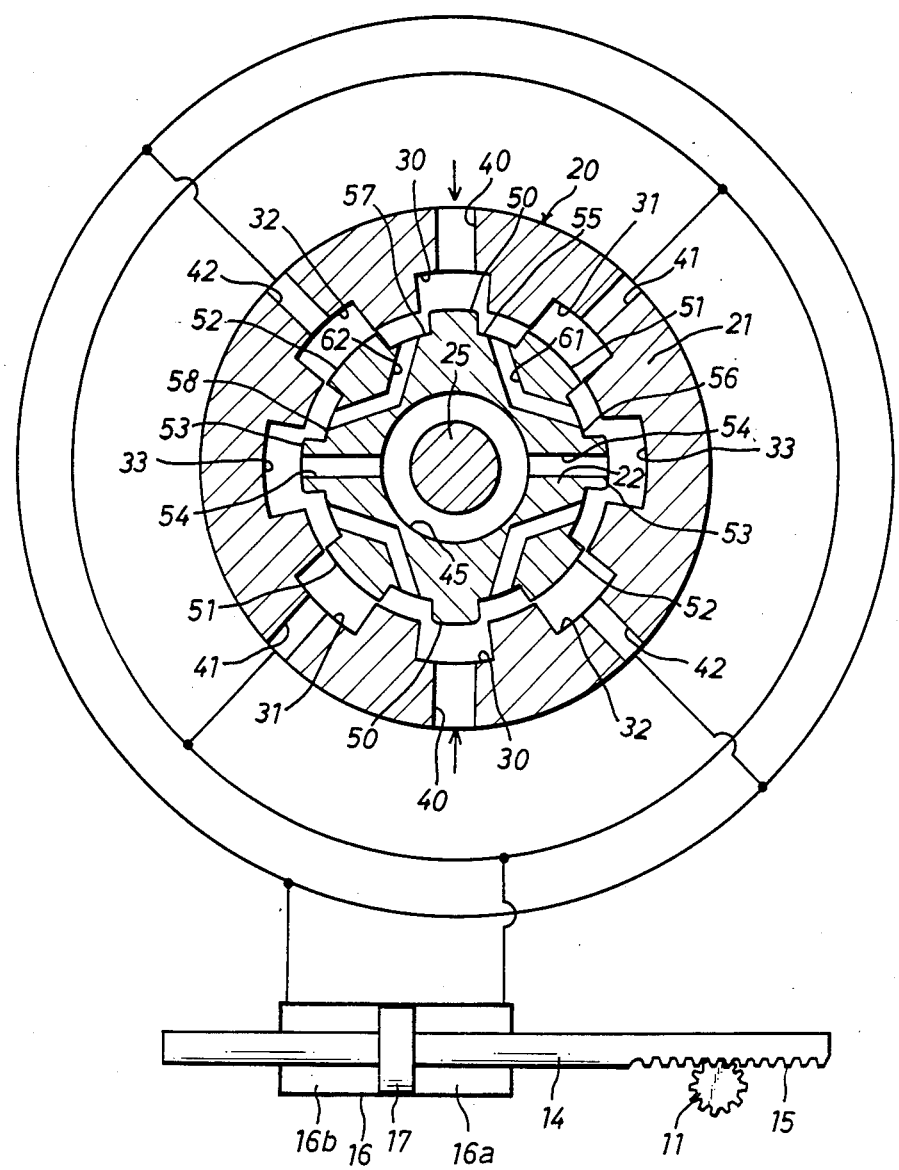
FIG. 2 is an enlarged cross-sectional view taken along line II—II in FIG. 1.

Referring now to the drawings, FIG. 1 illustrates a rotary servovalve 20 of the present invention adapted to a power-assisted steering mechanism of the rack-and-pinion type. The power-assisted steering mechanism includes a gear housing 10 in which a pinion shaft 11 is rotatably supported at its one end by means of a roller bearing 12 and at its other end by means of a ball bearing 13. The pinion shaft 11 is permanently in mesh with the toothed portion 15 of a rack member 14 which is in the form of an intermediate portion of a piston rod extending from a piston 17 in a hydraulic power cylinder 16 as shown in FIG. 2. The rack member 14 has opposite ends operatively connected in a usual manner to a pair of dirigible road wheels through link mechanisms (not shown).

A valve housing 18 is fitted to the gear housing 10 in a liquid-tight manner to contain the rotary servovalve 20 therein. The rotary servovalve 20 comprises a valve sleeve 21 coupled within an internal bore 19 of valve housing 18 and a valve rotor 22 coupled within the valve sleeve 21 for relative rotation thereto about the axis of pinion shaft 11. The valve sleeve 21 is connected at its one end to the pinion shaft 11 by means of a connecting pin 23. The valve rotor 22 is integrally formed with an input shaft 24 which is in the form of a hollow shaft rotatably mounted within the valve housing 18 and arranged to be operatively connected in a usual manner to a steering wheel (not shown). The input shaft 24 is interconnected to the pinion shaft 11 by means of a torsion bar 25 extending therethrough for relative rotation on aligned axes. Thus, the valve rotor 22 cooperates with the valve sleeve 21 to provide a changeover valve of the rotary type.

As shown in FIG. 2, the valve sleeve 21 is formed at the inner periphery thereof with a plurality of circumferentially spaced channels or grooves 30, 31, 32 and 33 and is formed in a peripheral wall thereof with a pair of diametrically opposed supply ports 40 which are connected to a source of fluid under pressure in the form of a fluid pump (not shown) through a corresponding inlet port 26 of the valve housing 18. The valve sleeve 21 is further formed in a peripheral wall thereof with a pair of diametrically opposed distribution ports 41 connected to a right-hand fluid chamber 16a of power cylinder 16 through a corresponding distribution port 28a of the valve housing 18 and formed in a peripheral wall thereof with a pair of diametrically opposed distribution ports 42 connected to a left-hand fluid chamber 16b of power cylinder 16 through a corresponding distribution port 28b of the valve housing 18. The pair of diametrically opposed sleeve channels 30 each are in open communication with the supply ports 40, the pair of diametrically opposed sleeve channels 31 each are in open communication with the distribution ports 41, and the pair of diametrically opposed sleeve channels 32 each are in open communication with the distribution ports 42.

Figure 3:
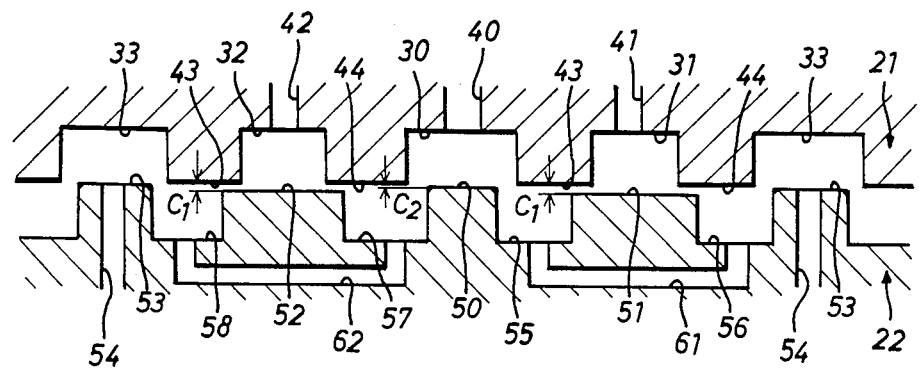
FIG. 3 is a developed view illustrating a positional relationship of control lands on a valve rotor shown in FIG. 2.

The valve rotor 22 is formed thereon with a plurality of circumferentially spaced control lands 50, 51, 52 and 53 which are arranged to correspond with the sleeve channels 30, 31, 32 and 33 when the servovalve is in a neutral position. The pair of diametrically opposed control lands 53 each are formed therein with a radial discharge hole 54 which opens into an axial bore 45 of valve rotor 22. As shown in FIG. 1, the valve rotor 22 is further formed with a pair of diametrically opposed radial discharge holes 46 which are communicated with a discharge port 27 of valve housing 18 through internal bore 19. As shown in FIG. 3, the control lands 50 of valve rotor 22 each are formed smaller in width than the channel 30 of valve sleeve 21 to form a pair of circumferentially spaced first restriction areas each in open communication with the supply port 40 when the servovalve is in the neutral position. Similarly, the control lands 53 of valve rotor 22 each are formed smaller in width than the sleeve channel 33 to form a pair of circumferentially spaced second restriction areas each in open communication with the radial discharge hole 54.

Formed between the control lands 50 and 51 is a rotor channel or groove 55 which is communicated with the sleeve channel 30 through one of the first restriction areas. Formed between the control lands 51 and 53 is a rotor channel 56 which is communicated with the sleeve channel 33 through one of the second restriction areas. The rotor channels 55 and 56 are communicated with each other through a passage 41 in the valve rotor 22. Formed between the control lands 50 and 52 is a rotor channel 57 which is communicated with the sleeve channel 30 through the other first restriction area. Formed between the control lands 52 and 53 is rotor channel 58 which is communicated with the sleeve channel 33 through the other second restriction area. The rotor channels 57 and 58 are communicated with each other through a passage 62 in the valve rotor 22.

For the purpose of retaining the piston 17 of power cylinder 16 in a neutral position against a disturbance reaction force acting thereon during high speed straight travel of the vehicle and of effecting smooth return operation of the steering wheel to the neutral position from a steered position, the control lands 51 and 52 of valve rotor 22 each are formed larger in width than the corresponding sleeve channels 31 and 32 and smaller in height than the adjacent control lands 50 and 53. Thus, a clearance $C_1$ is provided respectively between the control land 51 and corresponding sleeve lands 43, 44 and between the control land 52 and corresponding sleeve lands 43, 44. In a practical embodiment, it is desirable that the clearance $C_1$ is determined to be 26–36 $\mu$m larger than a clearance $C_2$ of 5–10 $\mu$m between the adjacent control land 50 and corresponding sleeve lands 43, 44. In FIG. 4 there is illustrated a test result conducted to confirm the fact that vibration of the steering wheel changes in accordance with a value of the clearance $C_1$. From the test result of FIG. 4, it has been found that vibration of the steering wheel decreases when the clearance $C_1$ is less that 33 $\mu$m. In FIG. 5 there is illustrated a test result conducted to confirm the fact that a return time of the steering wheel changes in accordance with a value of the clearance $C_1$. From the test result of FIG. 5, it has been found that return operation of the steering wheel to the neutral position is deteriorated when the clearance $C_1$ is less than 26 $\mu$m.

In a condition where the servovalve 20 is in the neutral position, the control lands 51 and 52 of valve rotor 22 are positioned to close the distribution ports 41 and 42 as shown in FIG. 2 so as to restrict the flow of fluid discharged from and supplied into the hydraulic power cylinder 16. In this condition, the fluid under pressure supplied into supply ports 40 flows into the discharge holes 54 through the sleeve channels 30, rotor channels 55, 57, passages 61, 62, rotor channels 56, 58, and sleeve channels 33 and is discharged into a reservoir (not shown) of the pump through the discharge port 27. Assuming that the valve rotor 22 is turned to the right in response to operation of the steering wheel, the communication between sleeve channels 30 and rotor channels 55 is interrupted by the control lands 50 of rotor 22, while the sleeve channels 31 are communicated with the passages 61 through rotor channels 55 to permit the flow of fluid discharged therethrough from the distribution ports 41 into the discharge holes 54. Simultaneously, the communication between rotor channels 58 and sleeve channels 33 is interrupted by the control lands 53, while the sleeve channels 32 are communicated with the passages 62 through rotor channels 58 to permit the flow of fluid under pressure supplied therethrough from the supply ports 40 into the distribution ports 42. Thus, the hydraulic power cylinder 16 is operated by the fluid under pressure supplied into the left chamber 16b from the distribution ports 42 of servovalve 20.

Figure 6:
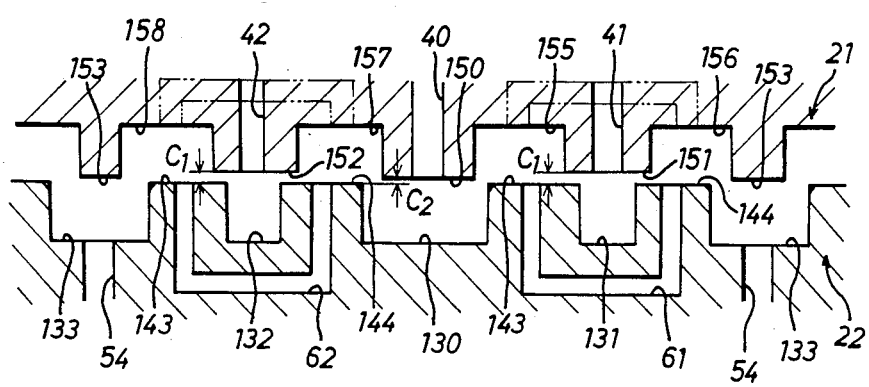
FIG. 6 is a developed view illustrating a modification of the positional relationship shown in Fig. 3.
Figure 7:
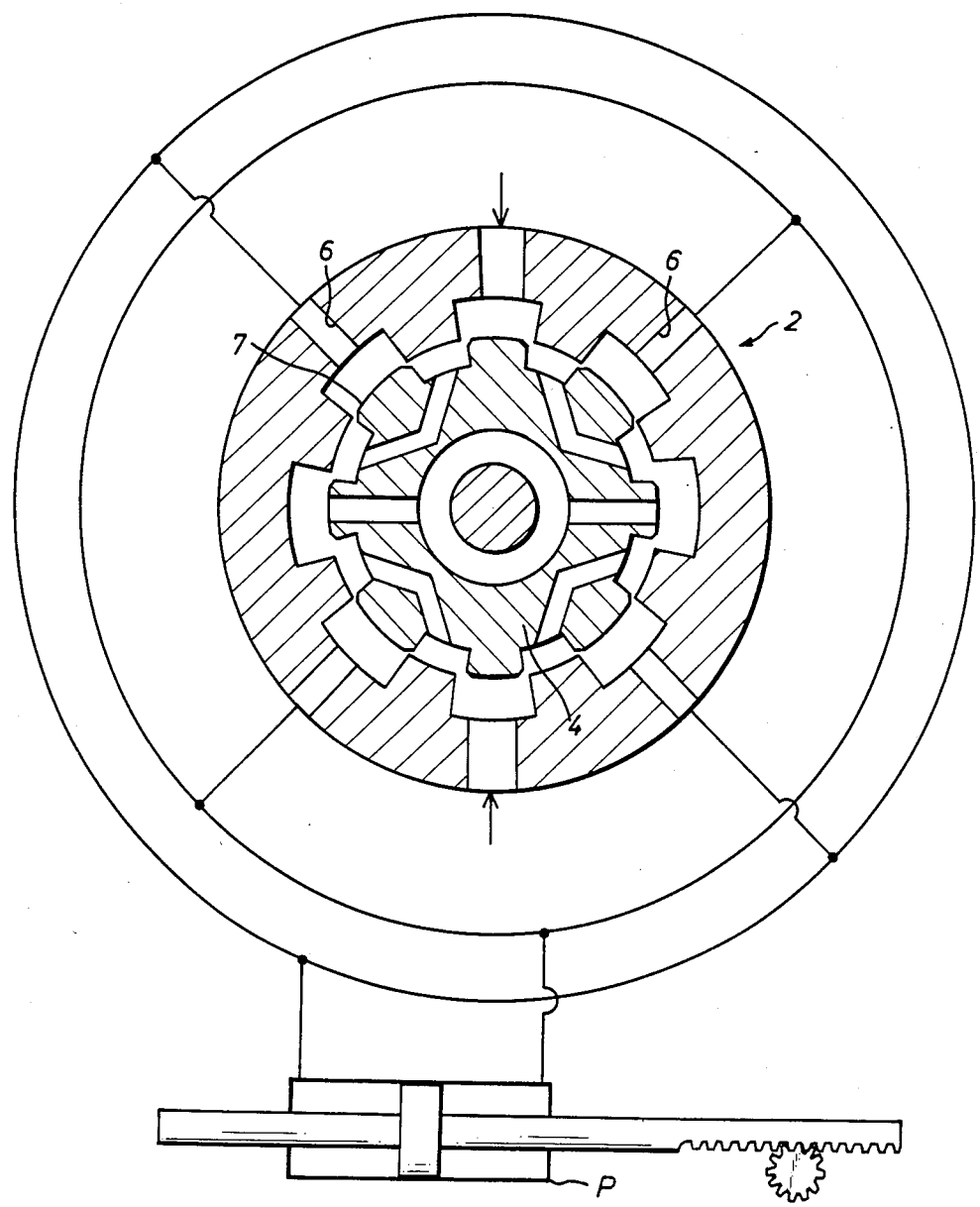
FIG. 7 is an enlarged cross-sectional view of a conventional rotary servovalve.

In FIG. 6 there is illustrated a modification of the positional relationship of control lands 50, 51, 52 and 53 of valve rotor 22, wherein the valve sleeve 21 is formed at the inner periphery thereof with circumferentially spaced control lands 150, 151, 152 and 153 which correspond with the control lands 50, 51, 52 and 53 of valve rotor 22 shown in FIG. 3, and wherein the valve rotor 22 is formed with channels 130, 131, 132 and 133 which correspond with the sleeve channels 30, 31, 32 and 33 shown in FIG. 3. In this modification, sleeve channels 155 and 156 formed between the control lands 150 and 151 and between the control lands 151 and 153 are communicated with each other through the passage 61 in valve rotor 22 when the servovalve is in the neutral position. Similarly, sleeve channels 157 and 158 formed between the control lands 150 and 152 and between the control lands 152 and 153 are communicated with each other through the passage 62 in valve rotor 22. The channels 130, 131, 132 and 133 of valve rotor 22 are arranged to be in open communication with the ports 40, 41, 42 and discharge holes 54, respectively. Thus, a clearance $C_1$ is provided respectively between the control land 151 and corresponding rotor lands 143, 144 and between the control land 152 and corresponding rotor lands 143, 144. The clearance $C_1$ is determined to be 26–36 μm substantially in the same manner as described above.

Although a certain preferred embodiment has been shown and described, it should be understood that many variations and modifications may be made therein without departing from the scope of the appended claims.

What is claimed is:

1. A rotary servovalve adapted for use in combination with a hydraulic power cylinder of a power-assisted steering system, comprising:

a valve sleeve formed in a peripheral wall thereof with a supply port for connection to a source of fluid under pressure and distribution ports respectively for connection to opposite fluid chambers of said power cylinder, said valve sleeve being formed at the inner periphery thereof with circumferentially spaced sleeve channels respectively in open communication with said supply and distribution ports; and a valve rotor coupled within said valve sleeve for relative rotation thereto, said valve rotor being formed thereon with circumferentially spaced control lands which are arranged to correspond with said sleeve channels when the servovalve is in a neutral position;

wherein said control lands corresponding with said sleeve channels in open communication with said distribution ports are each formed larger in width than said corresponding sleeve channel and smaller in height than said control land corresponding with said sleeve channel in open communication with said supply port to define a predetermined clearance for restricting the flow of fluid discharged from one of said distribution ports and supplied into the other distribution port when the servovalve is in the neutral position.

2. A rotary servovalve adapted for use in combination with a hydraulic power cylinder of a power-assisted steering system, comprising:

a valve sleeve formed in a peripheral wall thereof with a supply port for connection to a source of fluid under pressure and distribution ports respectively for connection to opposite fluid chambers of said hydraulic power cylinder, said valve sleeve being formed at the inner periphery thereof with circumferentially spaced control lands respectively in open communication with said supply and distribution ports; and a valve rotor coupled within said valve sleeve for relative rotation thereto, said valve rotor being formed at the outer periphery thereof with a plurality of circumferentially spaced channels which are arranged to correspond with said control lands of said valve sleeve when the servovalve is in a neutral position;

wherein said control lands in open communication with said distribution ports are each formed larger in width than said corresponding channel and smaller in height than said control land in open communication with said supply port to define a predetermined clearance for restricting the flow of fluid discharged from one of said distribution ports and supplied into the other distribution port when the servovalve is in the neutral position.

* * * * *